Oct. 30, 1951     D. A. SCHROCK     2,573,653
APPARATUS FOR THERMOCHEMICALLY CUTTING GEARS
Filed Jan. 19, 1948     3 Sheets-Sheet 1

Daniel A. Schrock
INVENTOR.

Daniel A. Schrock
INVENTOR.

Oct. 30, 1951 — D. A. SCHROCK — 2,573,653
APPARATUS FOR THERMOCHEMICALLY CUTTING GEARS
Filed Jan. 19, 1948 — 3 Sheets-Sheet 3
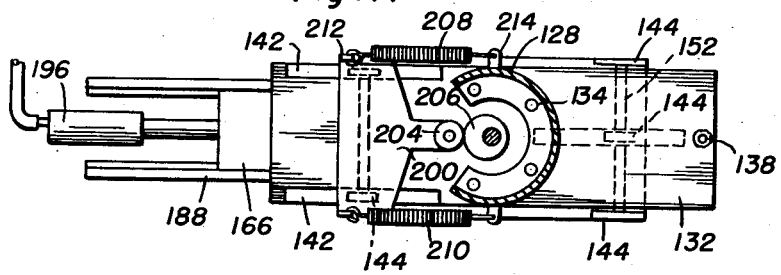
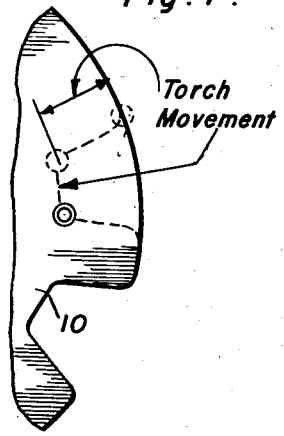
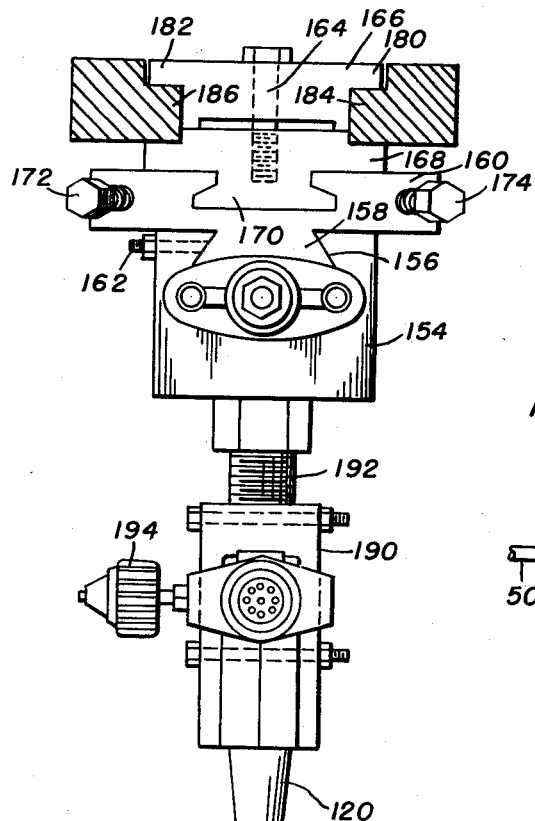
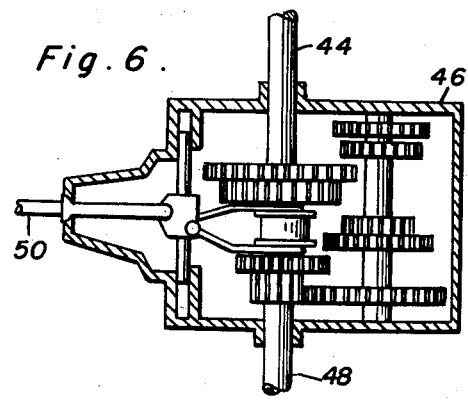
Daniel A. Schrock
INVENTOR.

Patented Oct. 30, 1951

2,573,653

UNITED STATES PATENT OFFICE 2,573,653

APPARATUS FOR THERMOCHEMICALLY CUTTING GEARS

Daniel A. Schrock, Boise, Idaho, assignor to Idaho Sprocket and Machine Works, Boise, Idaho, a copartnership Application January 19, 1948, Serial No. 3,116

6 Claims. (Cl. 266—23)

1

This invention appertains to novel and useful improvements in an apparatus for thermochemically treating materials, preferably metallic.

An object of this invention is to thermochemically remove material from sheet stock in order to form gears and the like therefrom.

Another object of this invention is to thermochemically cut a metallic sheet by means of moving a torch orbically in an undulated travel in order to form gear teeth.

Another object of this invention is to decrease the speed of the torch while in the undulated portion of the orbit of travel to efficaciously and completely cut the metal blank or stock.

Another object of this invention is to selectively control the speed of a sleeve relative to a concentric shaft, which sleeve has a torch associated therewith and which shaft urges the torch in devious travels in order to form gear teeth and the like.

A still further object of the invention is to control the speeds of the shaft and torch through the medium of a circuit breaker including a pair of elements which are operatively associated with the shaft and sleeve respectively, which control is ultimately afforded through the medium of an electrical bypass to the motor which introduces additional resistance in the electrical circuit.

Another purpose of this invention is to simultaneously urge a torch carriage in a selected direction by resilient means and also urge a cam follower against a cam, which cam is rigidly associated with the said shaft.

Another object of this invention is to vary the speeds of the shaft and sleeve through the medium of a mechanical variable ratio transmission having a driven and driving side, the driven side being also utilized for turning the shaft while the driving side is mechanically connected with the sleeve.

Ancillary objects and features of novelty will become apparent to those skilled in the art in following the description of the preferred form of the invention, illustrated in the accompanying drawings, wherein;

Figure 4 is a transverse sectional view taken substantially on a line 4—4 of Figure 1 and in the direction of the arrows;

Figure 5 is a sectional view illustrating the torch and torch support structure, taken substantially on a line 5—5 of Figure 1 and in the direction of the arrows;

Figure 6 is a sectional view of a typical mechanical variable gear ratio transmission utilized in association with the invention;

Figure 7 is a schematic view showing particularly the torch travel on a work piece or blank; and, Figure 8 is a wiring diagram showing the simplified electrical circuit utilized in association with the invention.

There are many types of devices for cutting gears or the like which may be classified under several broad headings. There are those in which the work piece is moved while the torch is held substantially stationary and those which revolve or otherwise move the torch, the work piece remaining stationary. The present invention relates to an improved method and apparatus for cutting the gears, falling under the latter class.

It is one of the prime purposes of the invention to supply a practical apparatus adapted for use in association with flat sheet stock wherein many gears or gear blanks might be cut by the thermochemical means. Of course, after a single gear is cut, the blank is simply moved to another position beneath the torch for a second operation.

By such an arrangement the entire apparatus for performing this operation may be suspended from the roof of a structure, cantilevered from a side wall or otherwise supported in order to obviate the usurpation of floor space.

Process

The preferred process or method of thermochemically removing metal includes various steps. A substantially flat work piece or stock 10 may be supplied on a suitable support (not shown) beneath an apparatus for performing cutting operations thereon.

A torch is maintained in spaced relation from the work piece and is moved in a substantially circular or arcuate travel with periodic deviations in the circular path. Otherwise spoken, the said torch assumes an orbically influenced travel in an undulated path in order that gear teeth might be formed from the blank. As the torch assumes its orbical travel the speed of the torch is relatively high, however, as it proceeds to form the undulated portion of the travel, the speed is decreased in order to form complete and efficacious cutting operations on the stock 10. The travel of the torch is influenced and controlled by various means, both mechanical and electrical which will be described in detail in association with the "apparatus."

*Means for supporting and actuating a sleeve and concentric shaft*

A frame generally indicated at 10 is supplied for support purposes. This frame may be of angle iron construction or the like and is adapted to be secured to a suitable anchor member such as a ceiling or the like. Wherever convenient and necessary platforms 12, 14 and 16, respectively, form a part of the frame for journaling various and sundry elements therein.

Figure 1:
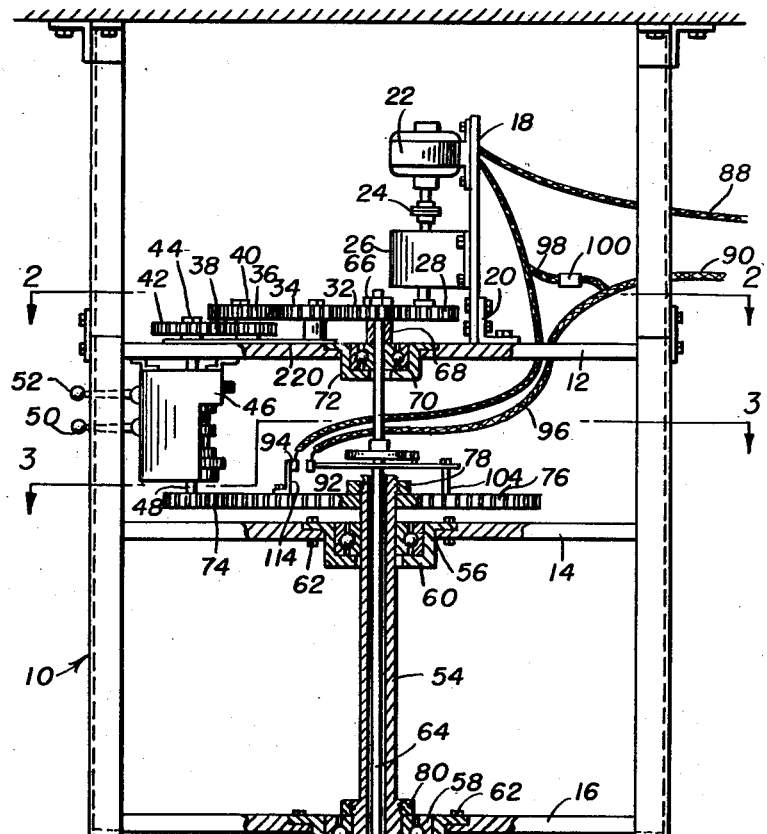
Figure 1 is a sectional view of the preferred form of the invention, showing the same in use with a typical work piece or blank.

A bracket 18 is attached to the said platform 12 through the medium of an angle iron member 20 and suitable, conventional bolts, rivets or the like. A suitable prime mover such as the motor 22 illustrated in Figure 1, is attached to the bracket 18 and a coupling 24 is secured to the power shaft associated therewith. A suitable reduction gear box 26 is also secured to the said bracket 18 and is juxtaposed relative to the motor 22.

Figure 2:
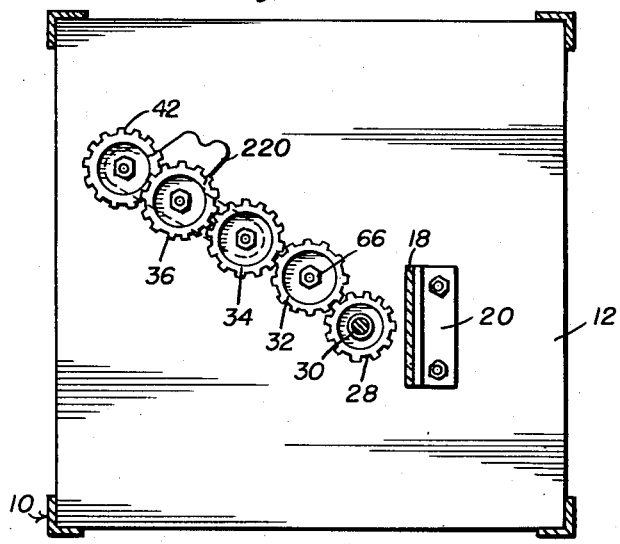
Figure 2 is a transverse sectional view taken substantially on a line 2—2 of Figure 1 and in the direction of the arrows.

Attention is now directed to Figure 2 wherein there is disclosed a gear 28 which is rigidly secured to the shaft 30 extending from the said gear reduction means 26. A plurality of idler gears 32, 34, 36 are journaled on the said platform 12 by means of conventional stub shafts. These idler gears are enmeshed and driven by the said gear 28. It will be noted at this point that the gears aforementioned are detachable in nature in order that gears of various descriptions may be substituted therefor if found desirable such as to increase or decrease the gear ratio further.

A gear 38 is rigidly secured to the shaft 40 which is also rigidly secured to the said gear 36. Through this medium the said gear 38 is rotated upon movement of the said gear 36. Further, an additional gear 42 is secured to a shaft 44, which shaft extends through the platform 12 and terminates in a gear box 46. The shaft 44 is obviously associated with the driving side of the gear box or mechanical variable ratio transmission therein, while the shaft 48 is associated with the driven side of the transmission.

The said gear box 46 contains a transmission which is purely conventional in nature, being utilized with small lathes and being capable of a 56-1 gear reduction by manipulation of the control rods 50 and 52, respectively.

A sleeve 54 is journaled in conventional anti-friction bearings 56 and 58, respectively, which are seated in suitable receptacles 60. These receptacles are supplied in suitable apertures in the platforms 14 and 16 by any suitable means such as the bolts 62, illustrated in Figure 1.

A concentric shaft 64 is rotatively received in the bore of the sleeve 54 and terminates at one end in the said gear 32. A suitable cap screw 66 may be secured to a threaded end portion of the said shaft 64 for maintaining this gear 32 in place. Further, a spacing collar 68 may be supplied beneath the said gear 32, resting on the inner race of a conventional anti-friction bearing 70, which is in turn seated in a receptacle 72 forming a portion of the platform 12.

It may now be seen that upon rotation of the gear 28 as influenced by the torque supplied by the motor 22, the concentric shaft 64 will also be rotated.

The driven shaft 48 extending from the driven side of the variable speed transmission has a gear 74 secured thereon which is meshed with a relatively large gear 76, which in turn is secured to the said sleeve 54 through the medium of a conventional nut 78 and pin construction. It may now be seen that the relative rotation of the shaft 64 and sleeve 54 may be regulated through the medium of either replacement of idler gears or manipulation of the handles 50 and 52 to employ various gear ratios in the conventional transmission.

The lower portion of the said tube 54 is journaled in the said platform 16 through the medium of the conventional anti-friction bearing 58 as described above. A conventional nut 80 is threadedly received on an enlarged portion 82 of the said sleeve 54 and the nut engages the inner race of the said anti-friction bearing 56. At the extreme end of the sleeve and more specifically the enlarged portion 82, there is supplied a flange 84 with a plurality of apertures (unnumbered) therein. Further, a conventional anti-friction bearing 86 is supplied in an enlarged bore at the terminal of the sleeve 54 for assisting in journaling the said shaft 64 therein.

*Means for increasing and decreasing the relative speed of the shaft and sleeve*

Referring primarily to Figures 1 and 8, a simplified wiring diagram shows the complete and sole electrical connections requisite for performing the above captioned function. One side of a conventional line 88 terminates in the motor 22. The other side 90 of the line terminates at a contact 92. This contact is a portion of a rotary switch to be described in detail subsequently. Another contact 94 which periodically engages the said contact 92 has a line or conductor 96 secured thereto. This conductor also terminates in the motor 22 and on the proper electrical polar connection.

A bypass conductor 98 bridges the conductors 90 and 96 and has a rheostat or other resistor 100 therein.

In operation of the rotary switch including the contacts 92 and 94, respectively, it is quite apparent that the current for actuation of the motor 22 is supplied selectively through the switch and through the resistor 100. When the current is supplied directly through the switch to the motor, a greater speed thereof is effected and while the current is supplied to the resistor 100, a relatively lower speed of the motor is produced. This of course, imparts various speeds to the sleeve 54 and the shaft 64.

Figure 3:
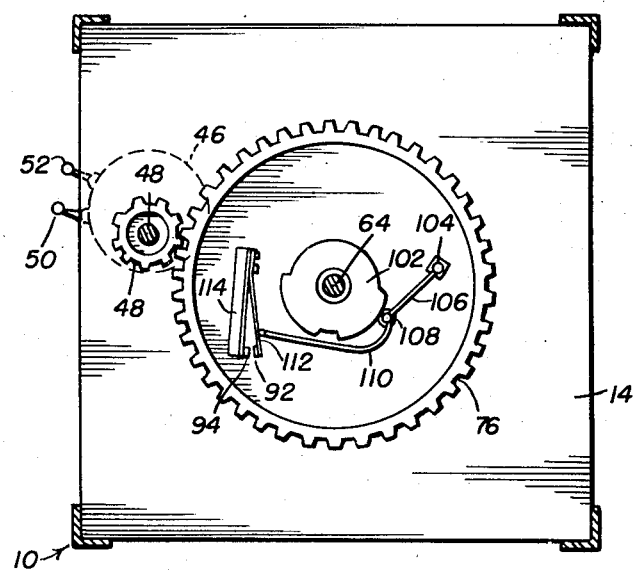
Figure 3 is a transverse sectional view taken substantially on a line 3—3 of Figure 1 and in the direction of the arrows.

The specific structure of the said switch may be seen best in Figure 3 wherein a cam 102 is attached to the said shaft 64. Attached to a suitable post 104 is a lever 106. The said post 104 is rigidly associated with said gear 76 and is of course, rotatable therewith. The cam follower 108 is secured to the said lever 106 and engages the periphery of the said cam 102. Of course, due to the configuration of the said cam 102, the cam follower 108 riding thereon, will urge the lever 106 in selected directions.

An arm 110 is pivotally associated with the said lever 106 at the same point as the cam follower 108. The opposite end of the said arm 110 is pivoted to a spring plate 112 having the said contact 92 thereon. The said contact 94 is secured to a suitable bracket 114 which is in turn secured to the said large gear 76. As the shaft 64 and sleeve 54 are rotated relative to each other, the contacts 92 and 94 will be intermittently engaged and disengaged as the cam 102 imparts lateral movement to the pivoted connection 108 of the members 106 and 110 thereby actuating the switch blade 112 due to the above described structure. By this expedient the motor 22 is supplied varying amounts of current for automatic variations in speed.

Means for supporting a torch

A torch 120 is supplied with suitable inlet conduits 124 and 126 for conducting an oxidizable material such as air and acetylene. The various rotations and speeds of the shaft and sleeve 64 and 54, respectively, are transmitted through a mechanism for moving the torch 120 orbically in an undulated path, thereby forming gears from the flat metal stock 10. A housing 128 is attached to said flange 84 through the medium of conventional bolts 130 or rivets. Through this expedient it is readily apparent that upon rotation of the sleeve 54, the housing 128 will also be moved in a rotative manner. A plate 132 is rigidly attached to the said housing 128 through the medium of the bolts 134 and this plate is of course rotatable with the housing and sleeve 54. In order to center the work and regulate the torch for the desired size of gears to be cut, a curved arm 138 is attached to the plate 132. This arm has its point terminating in alignment with the longitudinal axis of the said shaft 64. Through this expedient the distance between the torch and the pointer may be measured in order to determine the radius of the gear to be cut.

Pairs of slots 140 and 142 respectively are provided on and under the said plate 132 in order to accommodate rollers 144. These rollers are attached to suitable brackets 146 and 148, respectively, which form a portion of a carriage generally indicated at 150. It will be noted that the travel of the carriage is limited by the confines of the said slots 140 and 142 respectively, and the said rollers may be connected by suitable, conventional shafts 152.

Attention is now directed to Figure 5 wherein the specific means for actually supporting the torch per se is illustrated. A sliding block 154 is provided with a dovetail slot 156 which is slidably received by a dovetail tongue 158, depending from a bracket 160. A suitable set screw 162 extends through the sliding block 154 and frictionally engages the dovetail tongue 158 for locking purposes. Further, a retaining bolt 164 extends through another sliding block 166, which pivot pin terminates in a base plate 168. The said base plate has a circular bearing element 170 depending therefrom which terminates in a suitable recess in the element 160. Set screws 172 and 174 respectively, are provided in the plate or element 160 which operatively engage the tongue or bearing member 170 in order to restrict the rotation of the plate 160 and therefore the torch 120 in travel.

The said sliding block 166 is provided with shoulders 180 and 182 respectively, which seat on suitable flanges or tracks 184 and 186 formed in the beam 188. By this means the torch may be regulated in its adjustment both toward and away from the pointer 138 and also rotated about the axis of the pin 164 for further adjustment. Any suitable means may be utilized for attaching the conventional split bearing 190 which maintains the torch 120 to the sliding block 154. The illustrated means includes a shank 192 which has threaded connections.

Further, a mixture control knob 194 may be used in association with the conventional valve case or housing 196 illustrated in Figure 1.

The torch 120 being rotatable with the shaft 154 assumes a particular generally circular orbit and various adjustments may be effected by manual manipulation of the torch due to the adjustable structure herein described.

Means for urging the carriage 150 reciprocatively is provided. Through this expedient and due to the timed relative movement of the shaft 64 and sleeve 54, the gear teeth of various descriptions may be formed from the sheet metal blank 10. The preferred means for performing this function may be seen best in Figures 1 and 4 wherein the bracket 148 is illustrated as substantially U-shaped and has an extension 200 projecting therefrom. This extension is received in an opened end portion of the housing 128 and has a shaft 202 journaled therein. This shaft carries a cam follower or wheel 204 thereon which operatively engages a cam 206 which is detachably secured to the said shaft 64. Upon rotation of the shaft 64, the cam 206 is also rotated, thereby urging the cam follower 204 in a reciprocating manner. This in turn urges the carriage 150 in the same manner and also the torch 120 over the work piece 10.

Means for simultaneously urging the carriage in a return direction (as opposed to the direction of urging of the cam 206) and for maintaining the cam follower 204 against the surface of the cam 206, is supplied. The preferable means may be seen as a pair of conventional springs 208 and 210 respectively, which are secured to suitable perches 212 and 214. The said perches 212 are secured to the substantially U-shaped bracket 148 and the perches 214 are operatively associated with the said housing 128. Through this expedient the torch 120 is moved in its travel to form undulations or deviations from the substantially circular orbit of travel.

Various gear ratios may be obtained in order to control the speeds of operation of both the generally circular movement of the torch and also the deviations from the general circle. The requisite and desired gear ratios realized from the use of a conventional transmission are readily ascertainable and by removing of certain of the gears on the platform 12 and substitution of other gears of different properties, another ratio variation may be realized. For convenience in such a change, the gears 34, 36, 38 and 42, may be supplied on a gear rack 220 for easy removal and substitution of another subassembly.

From the foregoing description of the elements including the operation and method, a clear understanding of the invention is deemed manifest. However, it is apparent that variations may be made without departing from the spirit of the invention.

Having described the invention, what is claimed as new is:

1. An apparatus for thermochemically cutting gears from a sheet blank comprising a frame, a sleeve journalled in said frame, a shaft journalled in said sleeve, means for simultaneously rotating said sleeve and shaft at different predetermined, selected speeds, a torch, means for attaching said torch to said sleeve, means operated by said shaft for moving said torch toward and from the longitudinal axis of said sleeve in timed relation to rotation of said sleeve, means responsive to the relative positions of said sleeve and shaft for regulating the linear speed of movement of said torch with respect to the sheet blank.

2. The combination of claim 1 wherein said torch attaching means includes a plate having a carriage mounted for reciprocation thereon, said torch being mounted on said carriage, means for limiting the travel of said carriage on said plate.

3. The combination of claim 2 wherein said torch moving means includes a cam secured to said shaft, a cam follower secured to said carriage, and means for resiliently biasing said carriage in a direction to yieldingly hold said cam follower against said cam.

4. An apparatus for thermochemically cutting gears from a sheet blank comprising a frame, a sleeve journalled in said frame, a shaft journalled in said sleeve, means for rotating said sleeve and shaft at different predetermined, selected speeds, a torch, means for attaching said torch to said sleeve, means operated by said shaft for moving said torch toward and from the longitudinal axis of said sleeve in timed relation to the rotation of said sleeve, means responsive to the position of travel of said sleeve and shaft for regulating the speed of said torch, said torch attaching means including a plate having a carriage associated therewith, means for limiting the travel of said carriage on said plate, said sleeve and shaft rotating means including a mechanical variable gear ratio transmission driven by said first mentioned means, means for rotating said sleeve associated with the driven side of said transmission and means for rotating said shaft associated with the driving side of said transmission, a rotary switch having a first element secured to said shaft and a second element actuated by said sleeve, switch contacts movable relative to each other and secured to said second element, conductors forming a circuit including said motor and said contacts, a bypass conductor having a resistor in said circuit for supplying varied values of current to the motor in accordance with the relative positions of said switch contacts.

5. In an apparatus for thermochemically cutting, a torch and a support therefor, means for moving said torch in a generally circular path, means for periodically imparting a traversing movement deviating said torch from its circular path, means for decreasing the speed of the torch during said traversing movement, said means for moving said torch in a generally circular path including a motor attached to said support, a sleeve journalled in said support, means for drivingly connecting said motor and said sleeve, means for adjustably supporting said torch on said sleeve, said deviating means including a shaft in said sleeve having a cam thereon, means associated with said torch for engaging said cam to urge said torch in a travel devious to the generally circular path, a rotary circuit breaker including a first element attached to said sleeve and a second element attached to said shaft, contacts on said first element periodically engageable upon mutual rotation of the sleeve and shaft, an electrical circuit having said circuit breaker and motor therein, and means in said circuit for bypassing current to vary the speed of the said motor.

6. A gear cutter comprising a support, a first and second shaft mounted for rotation in said support, a motor means including a manually operable variable ratio transmission drivingly connected with said first shaft, said second shaft being rotated by said motor means, a switch in circuit with said motor means, means actuated by said second shaft periodically for rendering said switch operative, a resistance in circuit with said switch and said motor means decreasing the speed of said motor means and both of said shafts when said switch is rendered operative, a torch, means fixing said torch to said first shaft for generally orbical movement, and means carried by said second shaft and said last mentioned means for moving said torch in a travel devious to the generally orbical travel, including a cam and a cam follower, and resilient means urging said cam follower against said cam.

DANIEL A. SCHROCK.

REFERENCES CITED

The following references are of record in the file of this patent:

UNITED STATES PATENTS

| Number | Name | Date |
|---|---|---|
| 1,825,606 | Schmidt | Sept. 29, 1931 |
| 2,089,014 | Bucknam et al. | Aug. 3, 1937 |
| 2,142,436 | Clabeaux | Jan. 3, 1939 |
| 2,189,140 | Glaum, Jr. | Feb. 6, 1940 |
| 2,190,360 | Howard | Feb. 13, 1940 |
| 2,345,104 | Dittrich | Mar. 28, 1944 |
| 2,377,844 | Stone | June 5, 1945 |
| 2,378,017 | Hubkey | June 12, 1945 |
| 2,383,607 | Lovers et al. | Aug. 28, 1945 |

FOREIGN PATENTS

| Number | Country | Date |
|---|---|---|
| 438,940 | Great Britain | Nov. 26, 1935 |